(12) United States Patent
Kitajima (10) Patent No.: US 6,348,697 B1
(45) Date of Patent: Feb. 19, 2002

(54) MEDIA DETECTION METHOD AND DEVICE

(75) Inventor: Hideyuki Kitajima, Tokyo (JP)

(73) Assignee: Copyer Co., Ltd., Tokyo (JP)

(*) Notice: Subject to any disclaimer, the term of this patent is extended or adjusted under 35 U.S.C. 154(b) by 0 days.

(21) Appl. No.: 09/242,133

(22) PCT Filed: Jun. 11, 1998

(86) PCT No.: PCT/JP98/02570

§ 371 Date: Feb. 8, 1999

§ 102(e) Date: Feb. 8, 1999

(87) PCT Pub. No.: WO98/56699

PCT Pub. Date: Dec. 17, 1998

(30) Foreign Application Priority Data

Jun. 11, 1997 (JP) .............................. 9-169421

(51) Int. Cl.[7] .............................. B65H 7/14; G01V 9/04
(52) U.S. Cl. .................................. 250/559.4
(58) Field of Search ............... 250/559.4; 399/16; 271/258.01

(56) References Cited

U.S. PATENT DOCUMENTS 5,289,011 A * 2/1994 Wong et al. ............. 250/559.4

FOREIGN PATENT DOCUMENTS

| JP | 5-39144 | 2/1993 |
| JP | 2-270700 | 10/1993 |
| JP | 8-69550 | 3/1996 |

* cited by examiner

Primary Examiner—F. L Evans
(74) Attorney, Agent, or Firm—Dellett and Walters (57) ABSTRACT

A media detection method and device which can detect media precisely in spite of individual variations and mechanical assembly errors of optical sensors and contamination of light emitting and receiving parts of the optical sensors, and which, even when the medium is not yet provided, can make setting for medium detection and precisely detect the medium in a short time; wherein first, a comparison reference voltage of the differential amplifier (10) is set at 0 volts and the output of the differential amplifier (10) corresponding to the output of the optical sensor (11) is determined when or where a medium is absent; by applying the output of the differential amplifier (10) to a predetermined formula, a comparison reference voltage to be given to the differential amplifier (10) during the medium detection operation is determined; next, during the actual medium detection operation, this comparison reference voltage is applied to the differential amplifier (10) and the amplifier output is compared with a predetermined threshold to judge the presence or absence of the medium.

10 Claims, 5 Drawing Sheets

FIG. 3A  HIGHER SENSOR SENSITIVITY (SENSOR PLACED CLOSE TO MEDIUM)

FIG. 3B  LOWER SENSOR SENSITIVITY (SENSOR PLACED AWAY FROM MEDIUM)

MEDIA DETECTION METHOD AND DEVICE

TECHNICAL FIELD

The present invention relates to an image forming device, an image reading device or the like, and particularly to a media detection device including an optical sensor for detecting the presence or absence of a medium such as a recording medium at a predetermined position, or for detecting the width of such medium.

BACKGROUND ART

In an image forming device, generally, a medium and its width are detected in a series of initial operations prior to a printing or recording. The detection of a medium and its width is usually performed using an optical sensor which detects the medium in non-contact therewith. In particular, an image forming device such as a printer, a plotter or the like includes a movable carriage on which the optical sensor is mounted to move over a medium such that the medium and its width are detected. After this, it is checked whether a printing or recording is ready to start, and then the subsequent operations are performed.

In a conventional circuit which judges the presence/absence of a medium directly from an output of the optical sensor, a precise detection of the medium is not expected because the sensor output is not stable. Also, because of the uncertain state of the output, there may be a time difference between the actual sensor output timing and the timing as it should be. This will cause a difference between the actual amount of travelling a sheet and the instructed amount thereof, so that a problem will occur that a margin of the sheet varies.

In addition, erroneous operations could occur due to errors in electronic characteristics (difference in dark current) of the optical sensor itself, variation in the detected distance due to mechanical dimensional errors of the sensor, and assembly errors in mounting it on the carriage, as well as the contamination or paper powders attached to the light emitting and receiving parts of the sensor.

Further, in a structure where a medium is detected with the medium placed between the optical sensor and a medium supporting member or platen, additional structure is often employed which comprises a light absorbing member or low light reflectance member which receives infrared light from the light emitting part of the optical sensor in the absence of a medium, or a member adapted to cause the optical sensor to detect the medium's absence, the member closely placed opposite to the optical sensor. However, in a case where a high sensitive type of optical sensor is employed, or a particular sensor used happened to be highly sensitive, a problem could occur that a presence of a medium is detected in spite of no presence of such medium, and vice-versa, depending on variations in light reflectance (absorptance or transmittance) of the light absorbing or low reflectance member, differences in distance between the member and the optical sensor due to the way of its mounting, differences in the surface treatment or contamination thereof, etc.

An approach to overcome these problems in some of the prior art media detection devices, is to digitize the output signal from an optical sensor through an A/D converter to correct the signal. Alternatively, a structure is known which includes a comparison operation circuit having its non-inverting input terminal applied with the output from an optical sensor and its inverting input terminal connected to a combination of resistors and switching elements. This structure selectively provides a plurality of voltage values to the non-inverting input, based on the combination of the ON's and OFF's of the switching elements, so that the switching elements are sequentially turned ON and OFF to catch the ON/OFF states of the switching elements when the comparison operation circuit changes its output, thereby attempting to achieve a precisely detection of the presence or absence of a medium, as shown in Japanese Laid-open (KOKAI) application No. 5-270700.

In any of the foregoing prior art approaches including correcting the sensor output voltage around a threshold, changing the threshold itself, or using a programming to make a series of set-up operations of the ON/OFF states of the switching elements, the optical sensor should actually be activated at least once in each of two states: one with a medium and another with no medium, to recognize and store the output states regarding the presence and absence of the medium in both the two states, and thereafter an actual detecting operation is enabled. Thus, such prior art approaches each require at least twice the medium detections to be performs, resulting in a time-consuming and complicated processing and a significant load on a central processing unit (CPU).

Further, in the case where the presence of a medium is erroneously detected when no medium is present, due to the above-mentioned various factors, the initial setting, per se, of the two states of a medium can not correctly bee performed.

The present invention was made in view of these drawbacks of the prior art to provide a media detection method and device capable of precisely detecting a medium regardless of individual differences of optical sensors, errors in mounting them, or contamination of light emitting and receiving parts thereof, etc.

It is another object of the invention to provide a media detection method and device which enables a setting for precisely detecting a medium even when the medium has not yet provided, and even if the sensor output varies due to aging.

DISCLOSURE OF INVENTION

A media detection method according to the present invention is a method using an optical sensor for detecting reflected light of emitted light, and a differential amplifier having a detection signal input terminal for receiving an output of the optical sensor and a reference input terminal for receiving a reference input voltage, to detect a presence of a medium to be detected based on an output from the optical sensor, the method comprising the steps of: obtaining an output of the differential amplifier with the reference input terminal set at 0 volts, the differential amplifier being responsive to an output of the optical sensor when or where no medium is present; applying the obtained output of the differential amplifier to a predetermined formula so as to compute a value of voltage to next be applied to the reference input terminal of the differential amplifier; and when actually detecting a medium, applying the computed value of voltage to the reference input terminal of the differential amplifier while applying the output from the optical sensor to the signal input terminal of the differential amplifier such that the output of the differential amplifier is compared with a predetermined threshold to judge a presence or absence of a medium.

With this method, when actually detecting a medium, it is possible to precisely detect the medium by applying an appropriate reference input terminal voltage to the differential amplifier, against various factors of causing erroneous operations, including the optical sensor and its environment. In addition, only detecting an absent state of a medium prior to an actual media detection operation is sufficient to compute the reference input terminal voltage value, and hence, the media detection operation can quickly be started.

In the media detection method, let a voltage $V_{+i}$ be input to the detection signal input terminal of the differential amplifier, and let a voltage $V_{-i}$ be input to the reference input terminal, then the output voltage Vo is generally represented by:

$$Vo = \alpha(V_{+i} - V_{-i})$$

In one embodiment of the invention, it is preferable that the gain α of the differential amplifier is predetermined such that the output of the differential amplifier is not saturated when the output of the optical sensor, when or where no medium is present, is applied to the detection signal input terminal of the differential amplifier and the reference input terminal is set at 0 volts.

Also, preferably, the predetermined formula determines such a reference input terminal voltage, to next be applied to the differential amplifier, that the output value of the differential amplifier becomes 0 volts in response to the output of the optical sensor when or where no medium is present.

More specifically, the predetermined formula is given by the following:

$$V_{-x} = V_{ox}/\alpha$$

where $V_{ox}$ represents the output of the differential amplifier when the output of the optical sensor, when or where no medium is present, is applied to the detection signal input terminal of the differential amplifier and the reference input terminal is set at 0 volts, and $V_{-x}$ represents a voltage value to be applied to the reference input terminal such that the output of the differential amplifier, when or where no medium is present, becomes 0 volts.

Thus, the determination of the formula to compute the reference input terminal voltage value does not require any output of the optical sensor in the presence of a medium.

A media detection device according to the present invention, comprises: an optical sensor for detecting reflected light of emitted light; a differential amplifier having a detection signal input terminal for receiving an output of the optical sensor and a reference input terminal for receiving a reference input voltage; means for generating a reference input terminal voltage for the differential amplifier; a control means for obtaining an output of the differential amplifier with the reference input terminal set at 0 volts, the differential amplifier being responsive to an output of the optical sensor when or where no medium is present, and for applying the obtained output of the differential amplifier to a predetermined formula so as to compute a value of voltage to next be applied to the reference input terminal of the differential amplifier; and a judging means for judging a presence or absence of a medium by obtaining an output of the differential amplifier with the computed value of reference input terminal voltage applied to the differential amplifier and the output from the optical sensor applied to the signal input terminal of the differential amplifier such that the output of the differential amplifier is compared with a predetermined threshold.

In this media detection device, the optical sensor can be carried by a carriage which is moved over a medium to be detected. For example, in an image forming device or an image reading device, the optical sensor can be carried by a carriage on which a head is mounted, so as to detect a medium or the dimension of its width, etc.

This detection operation can be carried out at an arbitrary timing, such as immediately after power-on of the device, during an initial operation immediately before the first printing (or reading) operation after the power-on, or when a user wants.

The media detection device may further comprising: an A/D converter for converting an analog output of the differential amplifier into a digital signal; and a storage means for storing the predetermined formula; the control means including a central processing unit (CPU); the means for generating a reference input terminal voltage including a D/A converter; and the CPU obtaining the output of the differential amplifier with the reference input terminal voltage output from the D/A converter, set at 0 volts, the differential amplifier being responsive to the output of the optical sensor when or where no medium is present, and applying the obtained output of the differential amplifier to the predetermined formula, which is stored in the storage means, so as to compute a digital value of voltage to next be applied to the reference input terminal of the differential amplifier, and then applying the computed digital value to the D/A converter.

Such use of the A/D converter, D/A converter and CPU simplifies the hardware configuration, and facilitates the software control of the media detection device, also improving the versatility and flexibility of the control.

BEST MODE FOR CARRYING OUT THE INVENTION

Now, an embodiment of the present invention will be described with reference to the attached drawings.

Figure 1:
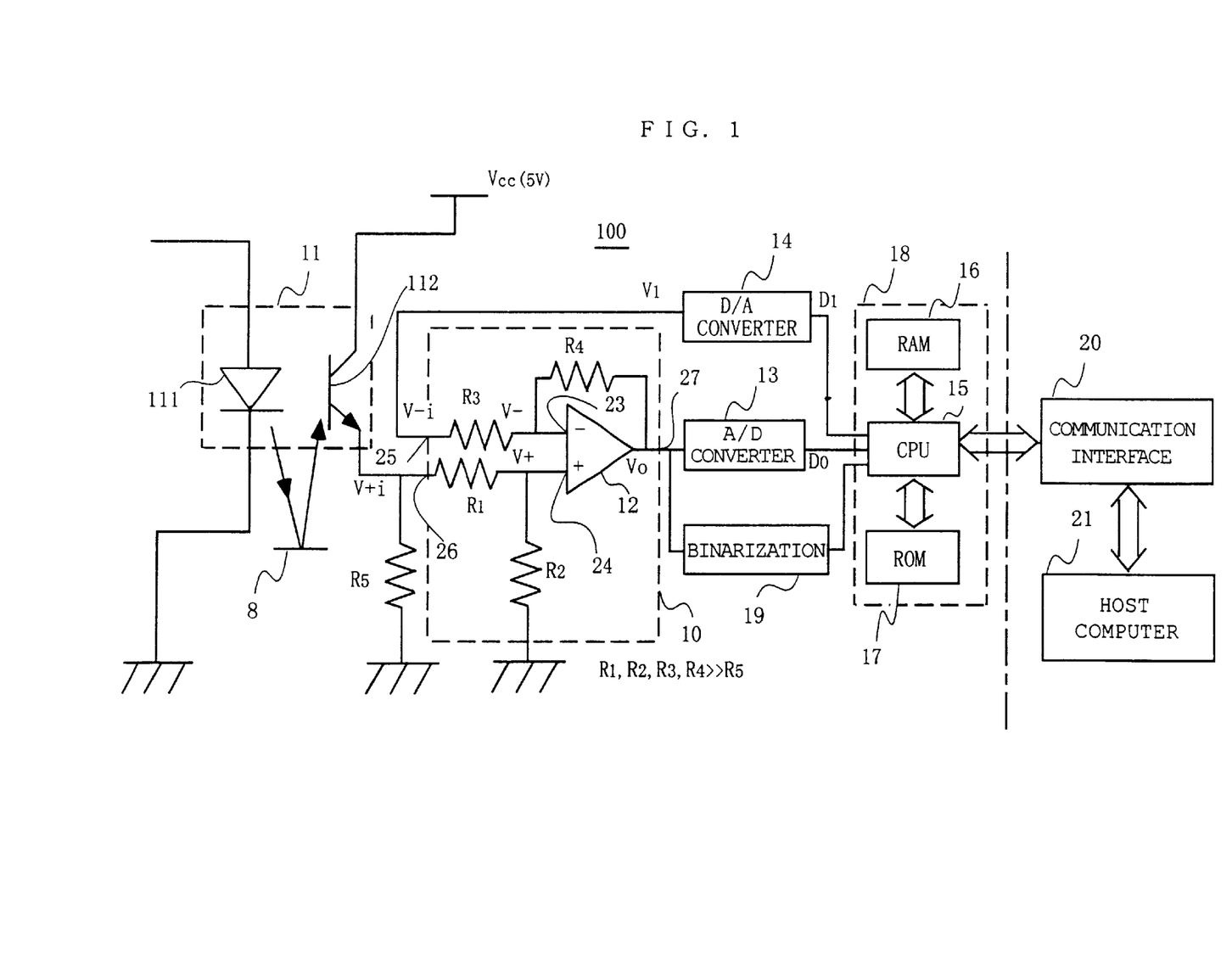
FIG. 1 is a block diagram showing a media detection device according to an embodiment of the present invention.

Referring first to FIG. 1, there is shown a block diagram of a media detection device 100 according to a preferred embodiment of the present invention.

The media detection device 100 mainly comprises an optical sensor 11, a differential amplifier 10, an A/D converter 14, a D/A converter 14 and a processing unit 18. In this embodiment, the media detection device 100 is incorporated in an image forming device such as a printer or the like. The processing unit 18 also acts to receive image data via a communication interface 20 from a host computer 21 and perform an image forming operation based on the received image data.

The processing unit 18 includes a CPU 15, a ROM (read only memory) 17 which stores therein an operation program and fixed data (including a formula described later) for the CPU 15 and a RAM (random access memory) 16 which provides a work area and a temporary storage area for the CPU 15.

The optical sensor 11 includes a light emitting part 111 such as a light emitting diode, a light receiving part 112 such as a photo-transistor or a photo-diode, wherein the light emitting part 111 emits light toward a potential medium 8 and the receiving part 112 detects the light reflected from the medium 8.

A detected current will flow through a resistor R5, and input as a detected voltage $V_{+i}$ to a detection input terminal 26 of the differential amplifier 10.

The detected voltage $V_{+i}$ input to the detection signal input terminal 26 is divided by a voltage divider which is composed of registers R1 and R2, and then applied to a non-inverting input terminal 24 of the comparison operation circuit 12. A resistor R3 is connected between an inverting input terminal 23 of the circuit 12 and the D/A converter 14, and also a feedback resistor R4 is connected between the input terminal 27 and the non-inverting input terminal 23. These resistors R1, R2, R3, R4 and the comparison operation circuit 12 constitute a typical differential amplifier. The output voltage Vo of the comparison operation circuit 12 is applied to the A/D converter 13. The CPU 15 applies a digital signal D1 to the D/A converter 14. In response to this, the D/A converter 14 generates an analog signal which is applied, as a reference input terminal voltage $V_{-i}$, to a reference input terminal 25 of the differential amplifier 10. This reference input terminal voltage $V_{-i}$ is applied through an input resistor R3 to the inverting input terminal 23 of the comparison operation circuit 12. The output of the differential amplifier 10 is applied to a binarization circuit 19, the output of which is then applied to the CPU 15.

Specific operations of the configuration of FIG. 1 is given below.

A principle of the present invention will now be explained.

The optical sensor 11 inevitably has a dark current. Electric variation due to the variation of the dark current and mechanical errors will cause variations of the sensitivity of the optical sensors 11 per se. Also, in using the optical sensor 11, even when any medium 8 to be detected is not present at the predetermined position, it is not possible that no object is present up to the infinity in front of the optical sensor 11. Therefore, the output of the optical sensor, which is actually placed in position, in a media non-detection state is far lower than the output current in a media detection state but is greater than the dark current. Thus, the output current (and hence, the output voltage) varies depending upon the variations of the optical sensors 11 per se and actual setting errors thereof.

Figure 2A:
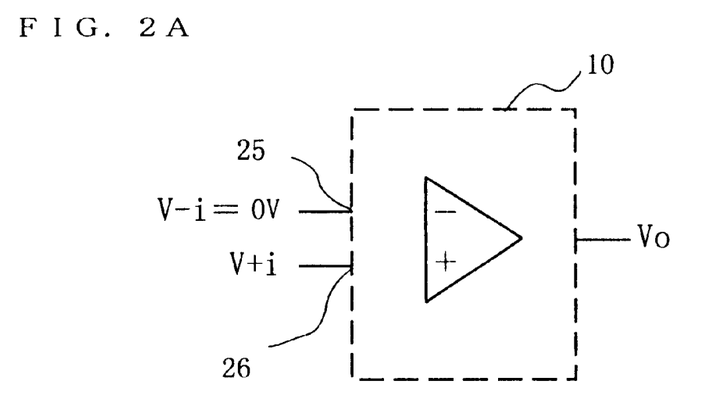
FIG. 2A is a diagram illustrating a concept of the differential amplifier 10 shown in FIG. 1.
Figure 2B:
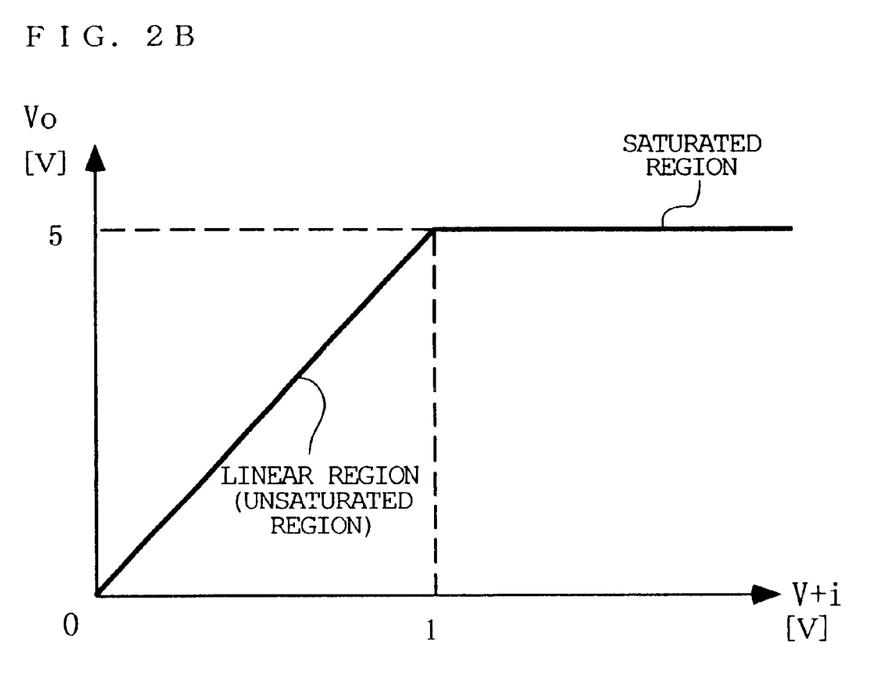
FIG. 2B is a graph for explaining the characteristics of the differential amplifier 10.

Then, in this embodiment, assuming an image forming device which performs a media detection, for example, a differential amplifier 10 is used with a power supply voltage of 5 volts and an output range of 0 to 5 volts, wherein at first the reference input terminal 25 is set at 0 volts while the detection signal input terminal 26 is applied with an output from the optical sensor 11 in the absence of a medium. It was shown that the output voltage from the optical sensor 11 in the absence of a medium is a small voltage of 0 to 1 volt or lower. Therefore, the gain of the differential amplifier 10 is set at, for example, 5 to 10 or so, such that the output from the optical sensor 11 in the absence of a medium exhibits an unsaturated linear area of 0 to 5 volts. That is, with the reference input terminal voltage $V_{-i}$ set at 0 volts as shown in FIG. 2A, the relationship between the non-inverting input voltage $V_{+i}$ and the output voltage Vo of the differential amplifier 10 becomes as shown in FIG. 2B. In this linear changing area of the unsaturated area, the variation of the voltage input to the detection signal input terminal 26 due to the variation of the optical sensor 11 is obtained as the variation of the output voltage Vo of the comparison operation circuit 12 at that time. The output value Vo is converted by the A/D converter 13 into a digital signal or digital value Do. In order to assure an operation range in which the optical sensor 11 is normally detects a medium, the CPU 15 uses a formula prestored in the ROM 17 to compute the digital value D1 based on the digital value D1 which is corresponds to a voltage V1 to be applied to the reference input terminal 25 in an actual media detection operation. The digital value D1 is then converted via the D/A converter 14 into the corresponding analog voltage V1 which is applied to the reference input terminal 25.

Figure 3A:
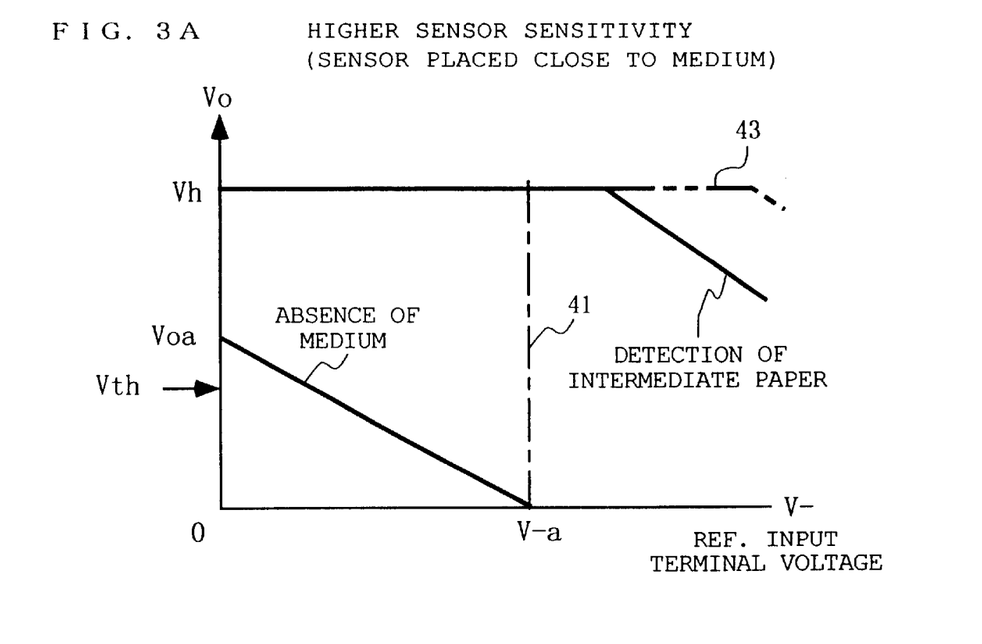
FIG. 3A is a graph illustrating a relationship between the reference input terminal voltage and the output terminal voltage of the differential amplifier 10 shown in FIG. 1 when the optical sensor sensitivity is high.
Figure 3B:
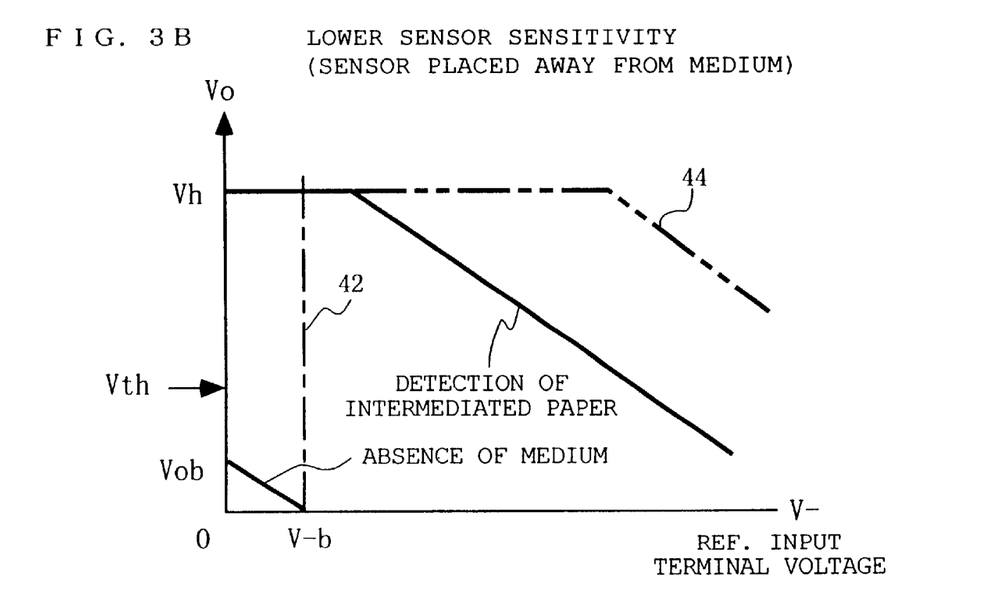
FIG. 3B is a graph similar to the graph of FIG. 3A, when the optical sensor sensitivity is not high.

The gain of the differential amplifier 10 is set by selection of resistors in the comparison operation circuit 12 which constitutes the differential amplifier 10 such that the output voltage Vo is not saturated with respect to a small voltage difference between the reference input terminal 25 and the detection input terminal 26. The formula prestored in the ROM 17 utilizes the linear relationship between the voltage difference and the output voltage. The small voltage difference in the present embodiment refers to 0 to 1 volts or so, when using a differential amplifier with its power supply voltage of 5 volts and an output range of 0 to 5 volts. For example, assume now two cases where the optical sensor 11 detects no medium and a medium of a lower light reflectance such as an intermediate paper, or the like. FIG. 3A shows a relationship between a voltage $V_-$ applied to the reference input terminal 25 of the differential amplifier 10 and an output voltage Vo thereof in a situation where the optical sensor sensitivity is high (or the sensor is placed relatively close to the medium). FIG. 3B is a graph similar to the graph of FIG. 3A, in a situation where the optical sensor sensitivity is not high (or the sensor is placed not close to the medium). Change of such situations as shown in FIGS. 3A and 3B inevitablly occurs even with a severe accuracy management in actual manufacture.

As mentioned above, the output voltage Vo of the differential amplifier 10 should have a linear relationship, in the unsaturated area, with the voltage difference between the reference input terminal 25 and the detection signal input terminal 26. To this end, an experiment was made to show what the value of the optical sensor 11 is output in the absence of a medium and what range the error is within. Based on this result, the gain of the differential amplifier 10 was determined.

Referring to the circuit diagram shown in FIG. 1, assume, for example, that the output voltage is 0 to 1 volt in the absence of a medium. This results in the following formula:

$$Vo=\{(R3+R4)/(R1+R2)\}(R2/R3)V_{+i} -(R4/R3)V_{-i}$$

Assuming R1=R3=R and R2=R4=5R, then the output voltage Vo is represented by the following formula:

$$Vo=5(V_{+i}-V_{-i}) \quad (1)$$

Thus, the gain is set at "5".

Using this formula (1), an explanation is given referring again to FIGS. 3A and 3B. As stated above, FIGS. 3A and 3B show the relationships between the output voltage Vo and the reference input terminal voltage $V_-$ of the differential amplifier 10. In FIG. 3A, "$V_{oa}$" represents the output voltage Vo when the reference input terminal voltage $V_-$ is set at 0 volts in the absence of a medium, and "$V_{-a}$" represents the reference input terminal voltage $V_-$ which will cause the output voltage Vo to be 0 volts. Similarly, in FIG. 3B, "$V_{ob}$" represents the output voltage Vo when the reference input terminal voltage is set at 0 volts in the absence of a medium, and "$V_{-b}$" represents the reference input terminal voltage $V_-$ which will cause the output voltage Vo to be 0 volts. When the reference input terminal voltage is set at 0 volts, the output voltage Vo is not 0 volts but $V_{oa}$, or $V_{ob}$. This is because the detection input terminal 26 receives the output voltage $V_{+a}$ or $V_{+b}$ in the absence of a medium.

These relationships are represented as follows:

$$V_{oa}=5(V_{+a}-0) \quad (2)$$

$$0=5(V_{+a}-V_{-a}) \quad (3)$$

$$V_{ob}=5(V_{+b}-0) \quad (4)$$

Formula (3) leads to:

$V_{-a}=V_{+a}$: The output voltage of the optical sensor 11 in the absence of a medium in the situation of FIG. 3A.

$V_{-b}=V_{+b}$: The output voltage of the optical sensor 11 in the absence of a medium in the situation of FIG. 3B.

These and formulae (2) and (4) are combined into:

$$5=V_{oa}/V_{-a}=V_{ob}/V_{-b} \quad (6)$$

In general, let $\alpha$ be the gain of the differential amplifier, then $\alpha$ is represented by:

$$\alpha=V_{oa}/V_{-a}=V_{ob}/V_{-b} \quad (7)$$

A value of the gain $\alpha$ can be determined by a designed value as seen from formula (1). However, it is preferable to determine the value by an experiment after the designing.

$$\alpha=V_{oc}/V_{-c} \quad (8)$$

where "$V_{-c}$" represents an experimental value of the reference input terminal voltage $V_-$ which causes the output voltage at 0 volts in the absence of a medium with respect to a particular optical sensor 11 employed in a particular device, and "$V_{oc}$" represents an experimental value of the output voltage Vo when the reference input terminal voltage $V_-$ of the differential amplifier 10 is set at 0 volts also in the absence of an medium.

In the experiment for determining the gain $\alpha$, the values Vo and $V_-$ will vary depending individual optical sensors 11 used in the experiment due to the variation of the sensors. However, this is not a problem since the gradient $\alpha$ is constant. In addition, the $\alpha$ value can be determined easily from a simple experiment without need for collecting output states of a lot of samples of the optical sensors 11.

A formula using this $\alpha$ value is stored in the ROM 17 and represented as follows:

$$V_{-x}=V_{ox}/\alpha \quad (9)$$

where "$V_{-x}$" is a parameter representing a reference input terminal voltage to be obtained with respect to a particular media detection device, and "$V_{ox}$" represents a value of the output voltage Vo when the reference input terminal voltage $V_-$ of the differential amplifier 10 is set at 0 volts in the absence of a medium in the media detection device.

After storing formula (9), in the ROM 17, having the value $\alpha$ determined, the output voltage $V_{ox}$ of the optical sensor 11 in the absence of a medium is applied to the detection signal input terminal 26 of the differential amplifier 10, and through the A/D converter 13 to the CPU 15 and RAM 16. Let Do be the digital value from the A/D converter 13 and substitute it in formula (9) retrieved from the ROM 17, then the digital value D1 is given corresponding to $V_{-x}$.

$$D1=Do/\alpha \quad (10)$$

This resultant digital value D1 is applied via the D/A converter 14, as an analog voltage V1, to the reference input terminal 25 of the differential amplifier 1, thus completing a setting for actually carrying out a media detection.

As a result, at a time of actually carrying out a media detection, if the sensor sensitivity is good as shown in FIG. 3A, then the differential amplifier 10 operates at the position indicated by a dot-and-dash line 41. When the sensor sensitivity has become lower for any reasons such as aging, as shown in FIG. 3B, the differential amplifier 10 operates at the position indicated by a dot-and-dash line 42. In either position 41 or 42, a maximum difference is provided between the values of the output voltage Vo in the presence and absence of a medium, thereby avoiding erroneous operations in judging with a fixed threshold Vth.

The medium detected in FIGS. 3A and 3B was assumed to be an intermediate paper. However, since its light reflectance is relatively low, a medium with a higher light reflectance will exhibit outputs as indicated by double-dot-and-dash lines 43 and 44. The example was selected from consideration of avoiding erroneous operations with respect to media of a low reflectance, and hence, needless to say, the same setting can apply to other types of media, i.e., media of a higher light reflectance.

In addition, if the reference voltage $V_-$ was set at 0 volts when performing a media detection with a threshold Vth as indicated in FIG. 3A, then the voltage $V_{oa}$ would exceed the threshold Vth, causing an erroneous judgement that a medium is present notwithstanding the fact that no medium is present. Such misjudgment will be avoided by this embodiment.

Figure 4A:
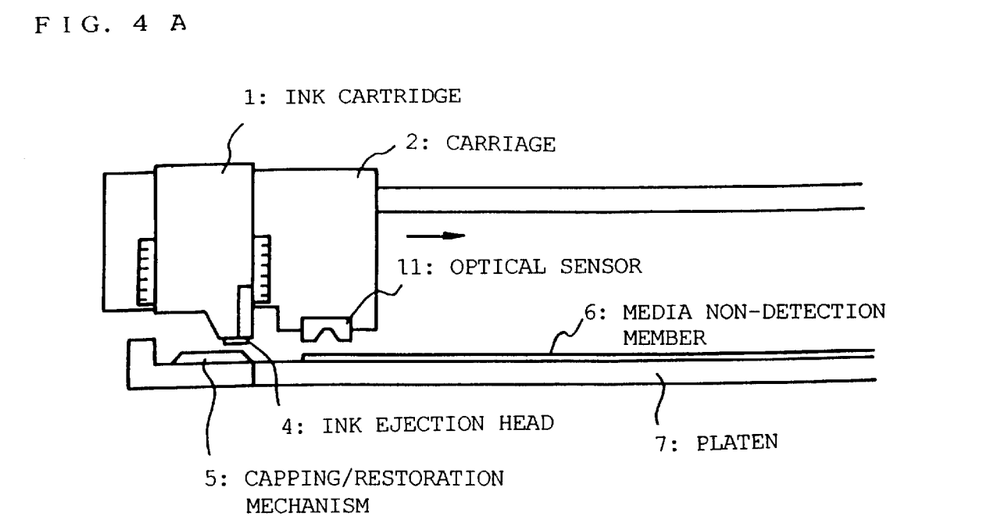
FIG. 4A is a front view of the mechanical structure of the related portion of an ink jet recording type of image forming device (e.g., printer, plotter, etc.) which utilizes the media detection device according to the present invention, where the carriage is at a predetermined position.
Figure 4B:
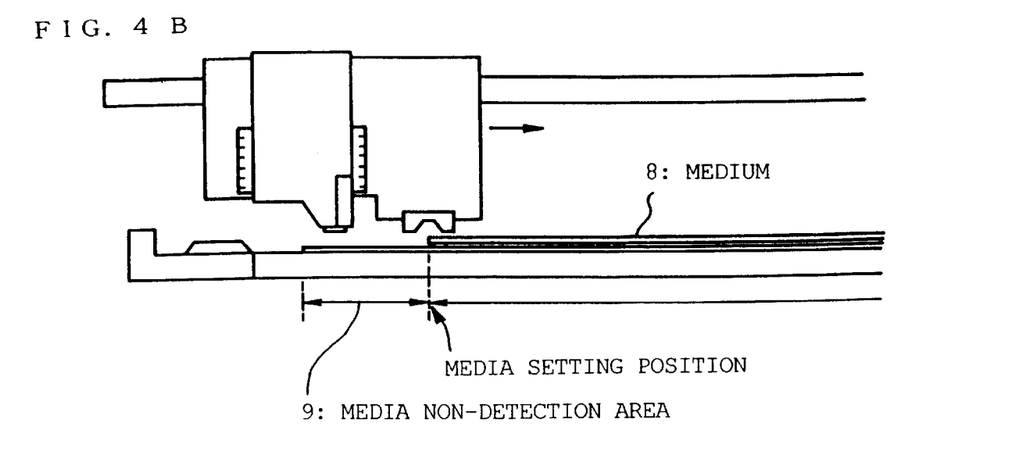
FIG. 4B is a front view similar to FIG. 4A, where the carriage is out of the predetermined position.

Referring to FIGS. 4A and 4B, an explanation will be given of a mechanical structure of a related portion of an ink jet recording type of image forming device (e.g., printer, plotter or the like) which employs the media detection device.

The image forming device includes a carriage 2 which is linearly movable driven by a motor (not shown), and which carries thereon an ink cartridge 1. The carriage 2 also carries a reflection type optical sensor 11 near the ink ejecting head 4. As the carriage 2 scans over a medium, the media detection and media width detection are carried out.

In the image forming device, as shown in FIG. 4A, the ink ejection head 4 is placed at a predetermined position such as a capping position where a capping/restoration mechanism 5 is provided, so as to avoid the ink ejection head 4 from drying ink thereon before a printing operation, and so as not to obstruct a user's media setting operation.

In printing, as shown in FIG. 4B, the ink ejection head 4 goes out of the predetermined position, and proceeds to a printing operation after confirming the setting of a medium 8. As described before, a reflection type sensor is used as the optical sensor 11 for the media detection, so that the presence of a medium 8 is detected by detecting, at the light receiving part, the light reflected from the medium 8.

In the present embodiment, at the position on a platen 7 where the optical sensor 11 detects the presence/absence of a medium 8, the shape or surface condition of the platen 7 is contrived so as not to provide reflected light to the optical sensor 11 when no medium is present at that position, or a member of a low light reflectance such as sponge or suede is attached on the platen 7 to form a media non-detection area 9 (FIG. 4B) which provides a state opposite to the state where a medium 8 is actually set. Such a media non-detection area 9 intended not to provide the reflected light into the light receiving part of the optical sensor 11 is extended in its width beyond the width occupied by the medium 8 set in position. This assures that regardless of the medium 8 being set or not, the media non-detection state (area) 9 is necessarily provided between the position from which the carriage starts its operation in initiating a printing and the position where an edge of a medium lies. In detecting the presence of a medium 8 itself and in the medium width detection for checking the adaptability of the medium 8 to a printing range thereon, the output voltage $V_{+i}$ of the reflection type optical sensor 11 in the absence of the medium 8 is obtained within the non-detection area 9 from the predetermined position to the medium edge, for the above-described the media detection.

Thus, according to the present invention, it is possible to make preparations for an appropriate media detection only by checking the output from the optical sensor 11 when or where a medium is not present, without a need for a state of a medium set in position as in the prior art, and also without a need for checking the output from the optical sensor 11 at that state. Therefore, a time taken to start a printing can be reduced.

Figure 5:
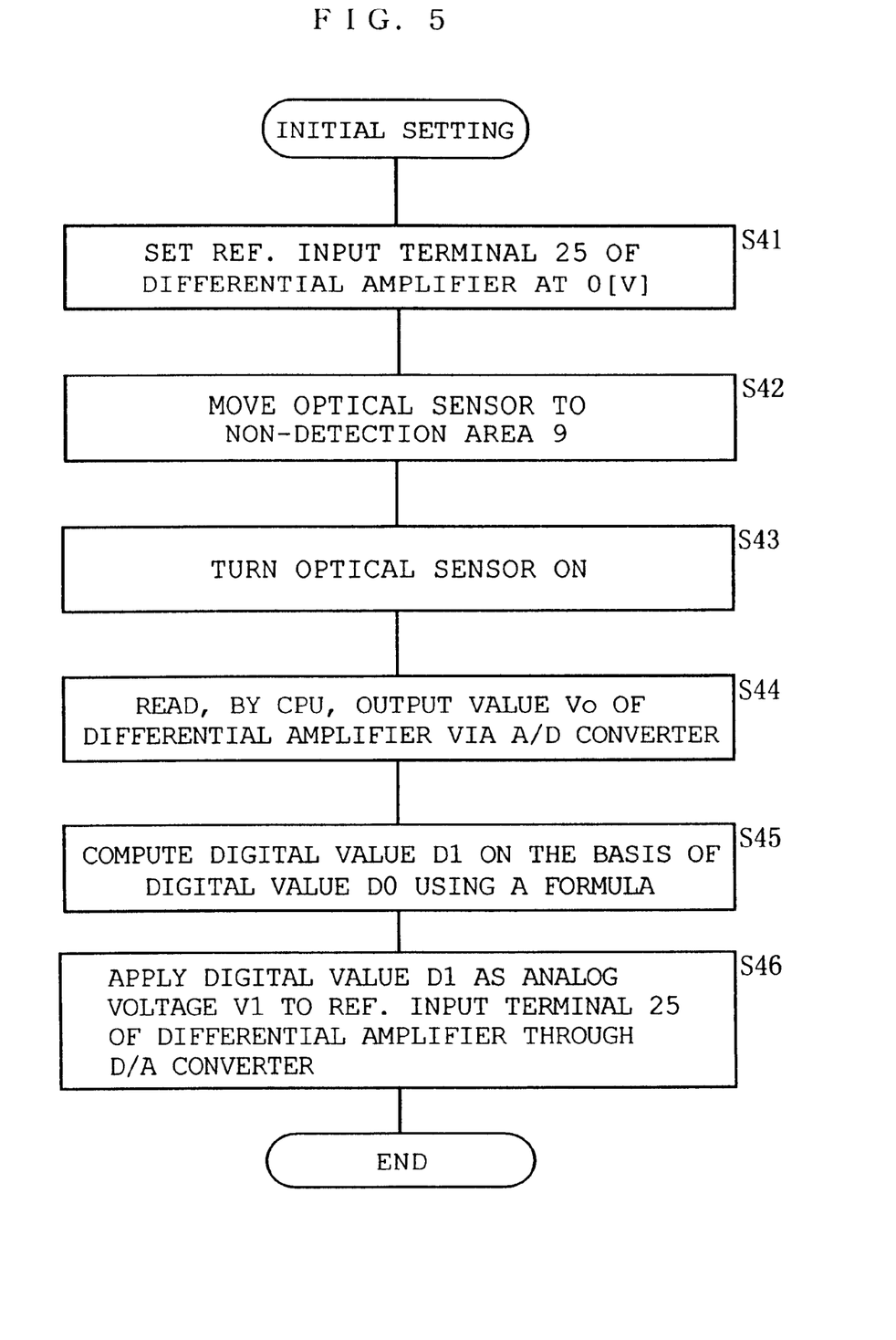
FIG. 5 is a flow chart illustrating a basic operation of an initial setting of the circuit configuration shown in FIG. 1.

Referring next to a flow chart shown in FIG. 5, an initial setting operation in the circuit configuration in FIG. 1 will be explained below.

This processing may be performed at various timings, such as (1) when initializing the device, (2) immediately before a first printing operation after a power on, (3) immediately before printing of each medium, (4) each time the carriage is scanned, (5) when instructed from a user, etc. At which timing the processing is to be performed may be arbitrarily determined depending upon the type of the device or a user's request.

First, the CPU 15 sets, via the D/A converter 14, the reference input terminal 25 of the differential amplifier 10 at 0[V] (S41). Subsequently, the carriage 2 is moved so that the optical sensor 11 is positioned in the non-detection area 9 (S42).

Then, the optical sensor 11 is turned ON into an activated state (S43). This causes the output voltage $V_{+i}$ of the optical sensor 11 in the non-detection area 9 is applied to the detection signal input terminal 26 of the differential amplifier 10. In the linear changing region for the differential amplifying of the differential amplifier 10, the output voltage Vo of the differential amplifier 10 is converted via the A/D converter 13 into a digital value Do, which is read by the CPU 15 (S44). The CPU 15 stores the digital value Do in the RAM 16, reads the prestored formula from the ROM 17, and computes the digital value D1 through the operation of the formula (S45). The digital value D1 is then converted via the D/A converter 14 into an analog voltage V1, which is in turn applied to the reference input terminal 25 (S46). Thus, the initial setting of the media detection device is completed.

After this setting is completed, the media detection and media width detection are started. In this event, the output voltage Vo is binarized with a predetermined fixed threshold vth in the binarization circuit 19 following the differential amplifier 10, which produces a high (H) or low (L) level output based on which the CPU 15 judges the presence or absence of the medium 8.

Alternatively, instead of using the binarization circuit 19, the CPU 15 may make a comparison with the threshold value based on the output of the A/D converter 13. In any case, the presence or absence of the medium 8 is judged based on the binarization of an electric signal.

In the forgoing embodiment, a description was made as to the optical sensor (particularly a reflection type one) for detecting a medium in the operation of the image forming device. However, the present invention is not limited to this particular embodiment, but is applicable, for example, to an image reading device which performs a media detection using an optical sensor.

Further, the media (medium) referred to in the specification is not limited to a recording medium, but is applicable to a member which is detected using an optical sensor for performing a switching operation.

As stated hereinbefore in detail, according to the invention, when using an optical sensor, a constant result can be obtained in a simple manner with respect to the variation in output capability of the optical sensor itself due to its product tolerance or errors inevitably produced in mounting the optical sensor. Also, it is possible to make preparations for a precise media detection only by detecting the state of the optical sensor in the absence of a medium, without actually performing a media detection by the optical sensor in the presence of a medium, thereby simplifying the operation setting after the media setting before the media detection, to reduce the time required for that.

Thus, a precise media detection can be realized in a simple manner and in a short time, to quickly proceed to the subsequent operations.

Industrial Applicability

The media detection method and device according to the present invention are applicable to an image forming device such as a printer, plotter, etc. and an image reading device such as a scanner or the like, and particularly to an arbitrary use for detecting a medium to be travelled. Further, it is applicable widely to the detection of any medium using an optical sensor.

What is claimed is:

1. A media detection method using an optical sensor for detecting reflected light of emitted light, and a differential amplifier having a detection signal input terminal for receiving an output of the optical sensor and a reference input terminal for receiving a reference input voltage, to detect a presence of a medium to be detected based on an output from the optical sensor, said method comprising the steps of:

obtaining an output of said differential amplifier with the reference input terminal set at 0 volts, said differential amplifier being responsive to an output of said optical sensor when or where no medium is present;

applying the obtained output of said differential amplifier to a predetermined formula so as to compute a value of voltage to next be applied to the reference input terminal of said differential amplifier; and when actually detecting a medium, applying the computed value of voltage to the reference input terminal of said differential amplifier while applying the output from said optical sensor to the signal input terminal of said differential amplifier such that the output of said differential amplifier is compared with a predetermined threshold to judge a presence or absence of a medium.

2. A method according to claim 1, wherein a gain $\alpha$ of said differential amplifier is predetermined such that the output of said differential amplifier is not saturated when the output of said optical sensor, when or where no medium is present, is applied to the detection signal input terminal of said differential amplifier while the reference input terminal is set at 0 volts.

3. A method according to claim 2, wherein said formula determines such a reference input terminal voltage, to next be applied to said differential amplifier, that the output value of said differential amplifier becomes 0 volts in response to the output of said optical sensor when or where no medium is present.

4. A method according to claim 3, wherein said predetermined formula is given by the following:

$$V_{-x} = V_{ox}/\alpha$$

where $V_{ox}$ represents the output of said differential amplifier when the output of said optical sensor, when or where no medium is present, is applied to the detection signal input terminal of said differential amplifier while the reference input terminal is set at 0 volts, and $V_{-x}$ represents a voltage value to be applied to the reference input terminal such that the output of said differential amplifier, when or where no medium is present, becomes 0 volts.

5. A media detection device, comprising:
an optical sensor for detecting reflected light of emitted light;
a differential amplifier having a detection signal input terminal for receiving an output of the optical sensor and a reference input terminal for receiving a reference input voltage;
means for generating a reference input terminal voltage for said differential amplifier;
a control means for obtaining an output of said differential amplifier with the reference input terminal set at 0 volts, said differential amplifier being responsive to an output of said optical sensor when or where no medium is present, and for applying the obtained output of said differential amplifier to a predetermined formula so as to compute a value of voltage to next be applied to the reference input terminal of said differential amplifier; and
a judging means for judging a presence or absence of a medium by obtaining an output of said differential amplifier with the computed value of reference input terminal voltage applied to said differential amplifier and the output from said optical sensor applied to the signal input terminal of said differential amplifier such that the output of said differential amplifier is compared with a predetermined threshold.

6. A media detection device according to claim 5, wherein said optical sensor is carried by a carriage which is moved over a medium to be detected.

7. A media detection device according to claim 5, further comprising:
an A/D converter for converting an analog output of said differential amplifier into a digital signal; and
a storage means for storing said predetermined formula;
said control means including a central processing unit (CPU), and said means for generating a reference input terminal voltage including a D/A converter; and
said CPU obtaining the output of said differential amplifier with the reference input terminal voltage output from said D/A converter, set at 0 volts, said differential amplifier being responsive to the output of said optical sensor when or where no medium is present, and applying the obtained output of said differential amplifier to the predetermined formula, which is stored in said storage means, so as to compute a digital value of voltage to next be applied to the reference input terminal of said differential amplifier, and then applying the computed digital value to said D/A converter.

8. A media detection device according to claim 6, further comprising:
an A/D converter for converting an analog output of said differential amplifier into a digital signal; and
a storage means for storing said predetermined formula;
said control means including a central processing unit (CPU);
said means for generating a reference input terminal voltage including a D/A converter; and
said CPU obtaining the output of said differential amplifier with the reference input terminal voltage output from said D/A converter, set at 0 volts, said differential amplifier being responsive to the output of said optical sensor when or where no medium is present, and applying the obtained output of said differential amplifier to the predetermined formula, which is stored in said storage means, so as to compute a digital value of voltage to next be applied to the reference input terminal of said differential amplifier, and then applying the computed digital value to said D/A converter.

9. A media detection device according to claim 7, wherein said predetermined formula is given by the following:

$$D1 = Do/\alpha$$

where $V_{ox}$ represents the output of said differential amplifier when the output of said optical sensor, when or where no medium is present, is applied to the detection signal input terminal of said differential amplifier while the reference input terminal is set at 0 volts, and $V_{-x}$ represents a voltage value to be applied to the reference input terminal such that the output of said differential amplifier, when or where no medium is present, becomes 0 volts; and
where Do represents an output of said A/D converter based on the output of said differential amplifier when the output of said optical sensor, when or where no medium is present, is applied to the detection signal input terminal of said differential amplifier while the reference input terminal is set at 0 volts, and D1 represents the reference input terminal voltage to next be applied to said D/A converter such that the output of said differential amplifier, when or where no medium is present, becomes 0 volts, and where a is a gain of said differential amplifier which is predetermined such that the output of said differential amplifier is not saturated when the output of said optical sensor, when or where no medium is present, is applied to the detection signal input terminal of said differential amplifier while the reference input terminal is set at 0 volts.

10. A media detection device according to claim 6, wherein a media non-detecting area is provided in a region within which said carriage is movable, but outside a region within which a medium can be present, and wherein the reference input terminal voltage is obtained based on an operation of said optical sensor at said media non-detecting area, and then said carriage moves toward said region within which a medium can be present, to thereby perform a media detecting operation.

* * * * *